United States Patent Office 3,161,843
Patented Dec. 15, 1964

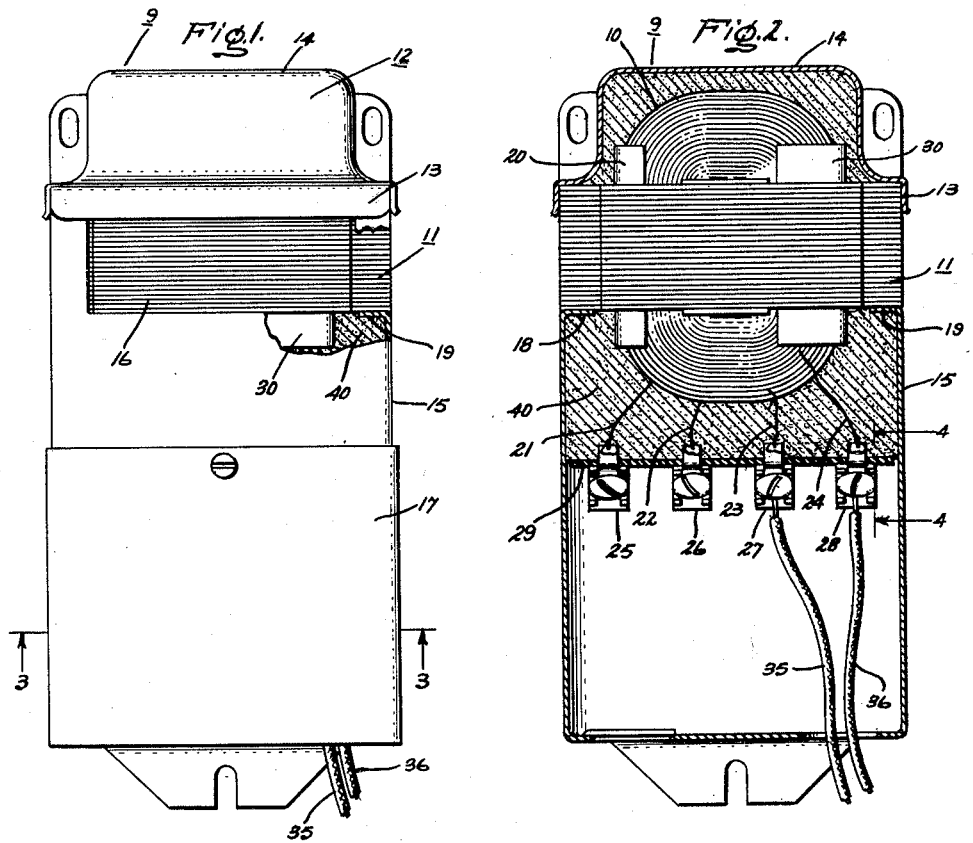
Dec. 15, 1964 — R. D. HODGES ETAL — 3,161,843
RESIN-COATED SAND FILLED INDUCTIVE DEVICE
Filed Sept. 6, 1960
Inventors:
Stanley J. Antalis,
Ralph D. Hodges.
Don C. Wood,
by Henry J. Marciniak
Attorney.

3,161,843
RESIN-COATED SAND FILLED INDUCTIVE
DEVICE
Ralph D. Hodges, Stanley J. Antalis, and Don C. Wood, Fort Wayne, Ind., assignors to General Electric Company, a corporation of New York
Filed Sept. 6, 1960, Ser. No. 54,257
10 Claims. (Cl. 336—96)

This invention relates to inductive devices, such as transformers, and more particularly to coil and magnetic core assemblies which are totally or partially enclosed by a metallic case.

Considerable advances have recently been made in the treatment of electrical devices with various thermosetting resins which serve the dual function of insulating electrical elements and dissipating the heat generated therein. Synthetic resins are widely used in encapsulating materials and insulating varnishes for various electrical devices, such as motors, transformers, reactors and condensers. The adverse effect upon thermal conductivity of shrinkage which accompanies curing of the resins has been a principal drawback to the widespread use of these materials as dielectric and thermally conductive fillings in totally or partially encased transformers or reactors.

It is well-known that the synthetic resins may, upon curing, undergo from 2 to 10 percent shrinkage in volume. Any appreciable contraction of a resinous filling in such transformers will result in the formation of voids between the coil and core assembly and the metallic case. The voids in effect act as thermal barriers and thereby detrimentally affect the heat transfer between the coil and core assembly and the ambient environment.

An example of a transformer construction in which the present invention may be employed is a transformer of the air cooled type. Such transformers are partially enclosed. The magnetic core is conventionally formed of a plurality of relatively thin laminations of magnetic material and has appropriate coils arranged thereon. The coil and core assembly is generally supported in a sleeve member having openings in the sides so that the edges of the laminations are exposed to the air and effectively cooled in this manner. An end cap is assembled on the top of the sleeve member and provides an enclosure for a portion of the coil. The external leads of the coil are brought out from the lower end of the sleeve member, the lower end thereby serving as a junction box. An inductive device of this type is more fully described and claimed in Patent No. 2,815,491—Antalis and Marsh, assigned to the same assignee as the present invention.

In such prior art constructions, difficulties have been encountered in that heat dissipation in the end cap, the sleeve member, and the lead finishing area was not satisfactory. To compensate for the poor heat dissipation, proportionately larger units had to be designed. Where air cooled transformers are intended for use as series multiple voltage units, the number of leads brought out from the transformer are increased. This results in a more complicated lead connecting operation and costlier lead finishing. Further, it is a requirement of the Underwriters' Laboratories that terminals, if used, be spaced at least one inch from each other and the casing where the voltage between the terminal and ground is between 251 and 600 volts. Where the voltage is less than 251 volts, it is required that the spacing be at least one-half of an inch. Thus, in order to conform with these requirements it is necessary that the terminals be positioned in a predetermined spaced relationship and be maintained in the spaced relationship. Therefore, it is desirable to provide a construction in which the terminals connected to conductors from the transformer coils can be permanently fixed in their respective spaced relationship with respect to each other and the transformer case.

Accordingly, it is an object of this invention to provide an arrangement that will achieve the desired results set forth above.

A more specific object of the invention is to provide an inductive device having an improved thermally conductive dielectric filling between the outer case and the core and coil assembly.

It is a further object of the invention to provide an air cooled transformer in which the heat generated in the transformer can be effectively dissipated.

Another object of the invention is to provide an improved transformer in which the leads are readily positioned and maintained in a predetermined spaced relationship with respect to each other and the transformer case.

According to the invention, a dielectric and thermally conductive interstitial mass is provided in the space between the metallic case of an inductive device and the core and coil assembly. The interstitial mass is formed of particles of inert material coated with a thermosetting resin. The resin coating on the particles is cured and partially fused to cohesively join the particles and form the interstitial mass within the metallic case. The interstices of the mass are impregnated with an insulating varnish. An interstitial mass, as the term is used herein, denotes a material that is substantially porous and permeable.

In another aspect of the invention, an air cooled transformer is filled with a dielectric and thermally conductive interstitial mass to the level of a terminal board to which are connected the coil conductors. The interstitial mass is comprised of sand coated with a thermosetting resin and fused at tangential points to form a porous and permeable body, the resinous coating comprising from 1 to 10 percent by weight of the sand. The terminal board and conductors are positioned by the interstitial mass.

The subject matter of the invention is set forth in the appended claims. The invention itself, however, together with further objects and advantages thereof may be understood by referring to the following description taken in connection with the accompanying drawing in which:

FIG. 1 is a front elevation partly broken away of a transformer embodying the present invention;

FIG. 2 is a sectionalized view of the transformer shown in FIG. 1;

FIG. 3 is a bottom sectional view of the transformer shown in FIG. 1 taken along the line 3—3; and FIG. 4 is a fragmentary view taken along line 4—4 of FIG. 2.

Referring now to the drawing, a transformer 9 in accordance with the invention is provided with a coil 10 and core assembly 11 formed of a stack of relatively thin laminations of magnetic material. The core 11 is of the shell type. An end cap 12 is provided having a rounded substantially rectangular flanged portion 13 substantially conforming to the configuration of the core 11. The end cap 12 also has a recessed portion 14 which accommodates the exposed end of the coil 10. While a single coil 10 is shown mounted on the center winding leg, it will be readily understood that this coil may include a primary winding and one or more secondary windings.

A sleeve member 15, formed of a single piece of relatively thin sheet material, such as steel, has a rectangular cross-section which substantially conforms to the configuration of the core assembly 11. It will be seen that the sleeve member 15 defines a window 16 at each side of the sleeve member 15 and partly exposes the core assembly 11. In conjunction with a cover plate 17 the lower end of the sleeve member 15 forms a junction box compartment for external leads of the transformer. The sleeve member 15 is also formed with inwardly extending flanges 18, 19 which support and position the core assembly 11. It will be seen that the peripheral flanged portion 13 of the end cap 12 cooperates with the inwardly extending flanges 18, 19 of the sleeve member 15 to securely engage the core assembly 11 in position. Insulators 20, 30 provide corner insulation for the coil 10.

As shown in FIG. 2, coil conductors 21, 22, 23, 24 are brought out from the coil 10 and are soldered to terminals 25, 26, 27, 28 of a terminal board 29. In the bottom view of the transformer shown in FIG. 3, it will be seen that four more terminals 31, 32, 33, 34 are provided on the terminal board 29. Two external leads 35, 36 are shown connected to the terminals 27, 28.

In the illustrative embodiment of the invention, when the coil 10 and core assembly 11 was assembled in the sleeve member 15 and the end cap 12 secured thereon, a resin-coated sand was poured into the transformer 9 while it was in an inverted position. The entire transformer 9 may be vibrated while the sand is poured to facilitate the filling operation. It is desirable that the resin-coated sand completely fill the transformer 9 up to the level of the terminal board 29. Thus, the sand positions the terminal board 29 at the desired level. It will be noted that the terminals 25, 26, 27, 28, 31, 32, 33, 34 extend behind the terminal board 9 into the resin-coated sand filling.

The sand used in the exemplification of the invention was a sand having a minimum of 98 percent by weight of pure silica, a maximum of .18 percent of organic materials and a maximum of .02 percent of conducting metals and oxides. The sand had an American Foundrymen's Society (AFS) grain fineness ranging from 90 to 110. The particle size of the inert material may vary depending upon a number of factors. The particles must not be so fine as to fuse into a substantially solid mass.

In accordance with the invention, the resin-coated particles when fused and cured must form an interstitial mass. In an application where it is desired that the dielectric and thermally conductive filling completely penetrate all the voids, a resin-coated inert material having a fine particle size would be employed. Generally, a resin-coated inert material having a particle size ranging from 10 to 100 mesh may be used. In the illustrative embodiment of the invention, the resin-coated sand was required to pass through a U.S. standard sieve No. 40.

Although sand was used in the illustrative embodiment of the invention, it will be understood that other inert materials may be used. Slate, chalk, alumina, calcium carbonate, mica or combinations of these materials in various proportions may be used. Preferably, sand is a suitable inert material because it is economically available and can readily be prepared to any desired fineness.

Many resins are suitable for coating the particles of inert material to be used to fill a transformer in accordance with the invention. In general, the B stage synthetic resins are particularly adaptable as a coating material. The term, "B stage resin," as used herein, denotes a resin in a stage of polymerization in which it is solid at room temperature, liquifies upon being heated and thereafter upon being cured solidifies into an infusible and substantially insoluble mass.

A group of ethoxyline resins for use in the invention is prepared by reacting a dihydric phenol with epichlorhydrin in alkaline solution. These products are of resinous character and in general are solid materials at normal temperature (20–30° C.). Any of the various dihydric phenols are used in preparing these glycidyl ethers, including mononuclear phenols like resorcinol, catechol, hydroquinone, etc., or polynuclear phenols like bis-(4-hydroxyphenyl)-2,2-propane (bis-phenol); 4,4'-dihydroxy benzophenone, bis - (4 - hydroxyphenyl) - 1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(hydroxy-2-tertiary butyl phenyl)-2,2-propane, bis(2-dihydroxynaphthyl)-methane, 1,5-dihydroxy naphthalene, etc.

Also, there can be used in the practice of this invention 1,2-epoxy-containing polyethers of polyhydric alcohols, such as polyglycidyl ethers thereof, like the diglycidyl ether of ethylene glycol, propylene glycol, trimethylene glycol, diethylene glycol, triethylene glycol, glycerol, dipropylene glycol and the like. Other typical ethers of this class include glycidyl ethers of polyhydric alcohols having a 1,2-epoxy equivalency greater than one, such as the polyglycidyl ethers of glycol, diglycerol, erythritol, pentaglycerol, mannitol, sorbitol, polyallyl alcohol, polyvinyl alcohol, and the like. In general, the glycidyl ether resin will have an epoxy equivalency greater than 1 and usually less than 2. The epoxy equivalency may be defined as the number of epoxy groups per molecule in contrast to the epoxy value which is the number of epoxy groups in 100 grams of the resin.

The coating in accordance with the invention may also include an agent for rapid setting or curing of the coating. For this purpose, there may be used small amounts of poly-functional amines, such as ethylene diamine, ethylene triamine, diethylene triamine, benzyl dimethylamine, 3-dimethylaminopropylamine, 3 - diethylaminopropylamine, tetraethylene pentamine and the like. These agents, which apparently effect cross linking in the epoxy resin, may be used in various amounts, although they usually are employed in the range of from 0.05 to 0.25 part per part by weight of resin.

An economical synthetic polyester resin, which may be used in the practice of this invention, is fully described in U.S. Patent No. 2,936,296—Precopio and Fox, assigned to the same assignee as the present invention. These resins comprise the product of reaction of (1) from 25 to 56 equivalent percent, preferably from 36 to 50 equivalent percent, of a lower dialkyl ester of a member selected from the class consisting of terephthalic acid and isophthalic acid and mixtures of said members, (2) from about 15 to 46 equivalent percent, and preferably from 25 to 40 equivalent percent of ethylene glycol, and (3) from about 13 to 44 equivalent percent, and preferably from 20 to 32 equivalent percent, of a saturated aliphatic polyhydric alcohol having at least 3 hydroxyl groups.

The resin, in powdered form, may be readily mulled on the sand. The powdered particles of a B stage resin do not stick to each other and therefore can be readily applied to the sand. In the illustrative embodiment of the invention, silica sand having an AFS fineness range from 90 to 110 based on a 100 gram sample was combined with a finely granulated phenolic resin comprising approximately 5 percent of the sand by weight. It was found that for the air cooled transformer 9 illustrating the invention, a resin-coated sand having 40 mesh particle size readily penetrated the spaces within transformer 9.

When the transformer 9 is filled with the resin coated sand, the entire assembly is heated at the curing temperature of the resin for a sufficient period of time to cure the resin. For the specific phenolic resin used in the illustrative embodiment, the curing period amounted to two and one-half hours and at a curing temperature of approximately 140 degrees centigrade. Thus, as the resinous coating on the coated particles cures, the particles are cohesively bound together to form an interstitial mass 40 without any significant appreciable shrinkage. Further, the fused interstitial mass 40 now rigidly positions the terminal board 29 and coil conductors 21, 22, 23, 24. As shown in the fragmentary view of FIG. 4, the terminal 28 extends into the interstitial mass and serves to anchor the terminal board 29 firmly to the interstitial mass 40.

After the resin coating has fused and cured, it is desirable that the interstitial mass 40 be impregnated with an insulating varnish. It was found that the coil could be satisfactorily impregnated with spirit and oil varnishes which are conventionally used to insulate electrical devices and to provide a moisture resistant coating. The purpose of the varnish is to fill the interstices of the interstitial mass in order to prevent moisture absorption and to improve the thermal conductivity of the mass. Black varnishes may be used since they possess good moisture resistance and have good dielectric properties.

In the illustrative embodiment of the invention, a varnish commercially known as Glyptal was used. This varnish is an oil modified thermosetting alkyd resin varnish and was thinned with petroleum spirits to form a solution containing between 49 and 51 percent solids and having a specific gravity at 125 degrees centigrade between .90 and .92.

To impregnate the transformer 9 with the alkyd resin varnish, it was placed in a vacuum chamber where the air and other undesirable volatile constituents were evacuated by subjecting the transformer 9 to a vacuum between 18 and 22 inches of mercury for a period of approximately two minutes and forty-five seconds. The varnish was admitted to the chamber under vacuum in an amount sufficient to cover the transformer 9. The vacuum was then released and atmospheric pressure applied for 10 seconds. The vacuum was again applied for one minute. The transformer 9 was then further treated by placing it in a heated oven to polymerize the thermosetting varnish to a solid state. In the exemplification of the invention, this treatment consisted of heating at a tempferature of 140 degrees centigrade for a period from 6 to 8 hours. It will, of course, be understood by those skilled in the art that other temperatures and other periods of heating may be required where different varnishes are used.

It will be seen that a number of significant advantages result from the practice of the present invention. The sleeve member 15 and end cap 12 of the air cooled transformer 9 are utilized as a mold into which the resin-coated sand is cast. Further, the case does not have to be a hermetically sealed unit since it does not have to contain a liquid. The fused and cured resin-coated sand filling also performs the important function of positioning the terminal board 29 in a predetermined position and also serves as a heat transfer medium.

In the illustrative embodiment of the invention, the normal preheat cycle for the varnish treatment was utilized to cure the resin coating on the sand particles. By utilizing the construction of the present invention, it was possible to reduce the temperature rise of the high voltage winding from 81.3 to 61.3 degrees centigrade. Thus, a reduction of approximately 24.5 percent in the temperature rise was effected.

The improved heat transfer is due to the fact that no appreciable srinkage occurs in the cured interstitial mass 40 which is thereby kept in intimate contact with the coil 10 and core assembly 11. Thus, the heat from the coil 10 is efficiently dissipated to the surrounding environment of the transformer 9.

It will be readily appreciated that mixtures of B stage resins selected from such resins as melamine formaldehyde resins, urea formaldehyde resins, silicon resins, epoxide resins such as the reaction product of epichlorohydrin and bis-phenol A, polyamide resins, vinyl resins, ethylene resins, styrene resins, butadiene styrene resins and others may be used as a coating material.

While we have shown and described a particular embodiment of the invention, it will be obvious to those skilled in the art that many modifications may be made. It is to be understood, therefore, that we intend by the appended claims to cover all such modifications that fall within the true spirit and scope of the invention.

What we claim as new and desire to secure by Letters Patent of the United States is:

1. In a magnetic core and coil assembly having a magnetic core, at least one coil assembly mounted on said core, and a metallic case partially encasing said core and coil assembly and a portion of said magnetic core, the improvement comprising a dielectric and thermally conductive interstitial mass filling the space between said metallic case and said core and coil assembly, said mass being formed of particles of inert material coated with a thermosetting resin coating cured to an infusible state to cohesively join said particles and form interstices of said interstitial mass, the interstices of said mass essentially impregnated with an insulating varnish.

2. In a transformer having a magnetic core, at least one coil assembly mounted on said core, and a metallic case at least partially encasing said core and coil assembly and providing a space between said metallic case and said core and coil assembly, the improvement comprising a dielectric and thermally conductive interstitial mass filling the space between the metallic case and the core and coil assembly, the interstices of said mass essentially impregnated with an insulating varnish, said mass being formed of particles of inert material having a coating of thermosetting resin ranging from 1 to 10 percent by weight of said particles of inert material, said resin coating on said particles cured to an infusible state to cohesively combine said particles into said interstitial mass and bring said mass in intimate contact with said core and coil assembly and said metallic case in order to provide an efficient heat transfer path from the core and coil assembly to said case.

3. In a magnetic core and coil assembly including a magnetic core, at least one coil assembly mounted on said core and having a plurality of conductors, a terminal board providing a means for connecting external leads to said coil conductors, said coil conductors connected to the terminals of said terminal board, and a metallic case enclosing at least a portion of said core and coil assembly and said terminal board, the improvement comprising a dielectric and a thermally conductive interstitial mass of resin coated particles of inert material having a thermosetting resin coating cured to an infusible state to form the interstices of said mass and filling the space between said magnetic core and coil assembly and said metallic case, said interstitial mass maintaining said terminal board in rigid assembly within said transformer and mantaining said coil conductors in a predetermined spaced relationship with each other and said metallic case, the interstices in said mass essentially impregnated with an insulating varnish.

4. In a magnetic core and coil assembly having a magnetic core, an electric coil mounted on said core, and a metallic case covering at least a portion of said magnetic core and coil assembly, the improvement comprising a dielectric and thermally conductive interstitial mass filling the spaces between said metallic case and said magnetic core and coil assembly, said interstitial mass comprising a porous body of particles of inert material coated with a B stage resin cured to a solid and infusible coating, the interstices of said mass essentially impregnated with an insulating varnish.

5. The magnetic core and coil assembly as set forth in claim 4 in which the cured stage B resin coating comprises from 1 percent to 10 percent by weight of the inert particles.

6. In a magnetic core and coil assembly including a magnetic core, an electrical coil mounted thereon, and a metallic case enclosing a portion of said magnetic core and coil, the improvement comprising a dielectric and thermally conductive interstitial mass disposed in intimate contact with at least a portion of the surface of said magnetic core and coil and a portion of the interior surface of said outer metallic case thereby effectively transferring heat generated during operation of the transformer from said coil to the ambient environment, said mass comprising a porous body of inert particles coated with a B stage resin cured to an infusible state, and selected from the group consisting of ethoxyline resin, polyester resin and phenolic resin, said cured resin cohesively joining said particles to form said interstitial mass, and said interstitial mass essentially impregnated with an insulating varnish.

7. In a transformer having a core formed of a plurality of stacked laminations and having at least one coil thereon, a sleeve member having a cross section substantially conforming to the outer configurations of said core laminations and having an opening to expose the outer edges of said laminations, an end cap connected to the sleeve member and forming an enclosure at one end of said sleeve member, and a terminal board disposed within said sleeve member and having connected thereto conductors from the coil, the improvement comprising a dielectric and thermally conductive interstitial mass disposed within said sleeve member and end cap and filling the spaces therein, said interstitial mass comprising a porous body of particles of inert material coated with a cured infusible thermosetting resin cohesively joining said particles, said interstitial mass essentially impregnated with an insulating varnish and maintaining the conductors and the terminal board in fixed spaced relationship.

8. The transformer as set forth in claim 7 wherein the particles of inert material are composed of silica sand.

9. The transformer as set forth in claim 7 wherein the inert particles are coated with a cured phenolic resin.

10. The transformer as set forth in claim 7 wherein the insulating varnish is an oil modified alkyd resin.

References Cited by the Examiner

UNITED STATES PATENTS

| | | | |
|---|---|---|---|
| 1,935,885 | 11/33 | Meissner | 336—96 X |
| 1,947,085 | 2/34 | Hill | 336—96 X |
| 2,464,568 | 3/49 | Flynn et al. | 336—96 |
| 2,688,780 | 9/54 | Anderson | 22—194 X |
| 2,812,561 | 11/57 | Hetzel | 22—193 |
| 2,882,505 | 4/59 | Feder | 336—96 |
| 2,930,011 | 3/60 | Wigert | 336—96 |
| 2,948,930 | 8/60 | Herbst | 336—96 X |
| 2,991,267 | 7/61 | Bean | 22—193 X |
| 3,030,597 | 4/62 | Piaia et al. | 336—96 |

OTHER REFERENCES

Electronics Magazine, August 1, 1957, vol. 30, No. 8, pages 258, 260, 262, 264, 266, 268.

JOHN F. BURNS, *Primary Examiner.*

ORIS L. RADER, E. JAMES SAX, *Examiners.*